(12) United States Patent
Suonvieri

(10) Patent No.: US 6,795,415 B1
(45) Date of Patent: Sep. 21, 2004

(54) ARRANGEMENTS FOR CONTROLLING NETWORK ELEMENTS

(75) Inventor: Jukka Suonvieri, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/512,120

(22) Filed: Feb. 24, 2000

Related U.S. Application Data

(63) Continuation of application No. PCT/FI98/00678, filed on Aug. 31, 1998.

(30) Foreign Application Priority Data

Sep. 1, 1997 (FI) .................................................. 973580

(51) Int. Cl.$^7$ ................................................ H04Q 7/00
(52) U.S. Cl. ...................... 370/333; 370/353; 370/365
(58) Field of Search ............................... 370/243, 246, 370/278, 465, 463, 351, 352, 353, 354, 355, 356, 252, 401, 522, 400, 419, 333, 365; 375/222; 455/424; 709/223; 379/208.01, 93.28

(56) References Cited

U.S. PATENT DOCUMENTS

| | | | | |
|---|---|---|---|---|
| 5,025,500 A | * | 6/1991 | Phinney | ...................... 370/462 |
| 5,237,561 A | * | 8/1993 | Pyhalammi | .................. 370/244 |
| 5,323,384 A | | 6/1994 | Norwood et al. | |
| 5,513,343 A | | 4/1996 | Sakano et al. | |
| 5,815,799 A | * | 9/1998 | Barnes et al. | .................. 455/15 |
| 6,188,684 B1 | * | 2/2001 | Setoyama et al. | .......... 370/352 |
| 6,529,486 B1 | * | 3/2003 | Barnes et al. | ............... 370/327 |
| 6,535,517 B1 | * | 3/2003 | Arkko et al. | ............... 370/401 |

FOREIGN PATENT DOCUMENTS

| | | |
|---|---|---|
| EP | 0 644 679 | 3/1995 |
| WO | 98/29962 | 7/1998 |

OTHER PUBLICATIONS

International Search Report for PCT/FI98/00678, Jun. 4, 1999.

* cited by examiner

Primary Examiner—Ajit Patel
Assistant Examiner—Yvonne Quy Ha
(74) Attorney, Agent, or Firm—Squire, Sanders & Dempsey L.L.P.

(57) ABSTRACT

The idea of this invention is to use at least two modems on the network management system side. At least one of these modems is used only for connections initialized by the network management system. At least one other modem is used only for connections initialized by any or a group of network elements controlled by the network management system. The number of modems used for connections initiated by the management system may be more than one, thus enabling the network management system to initiate simultaneous connections to more than one network element. Likewise, more than one modem can be assigned for connections initiated by the network elements.

10 Claims, 4 Drawing Sheets

ARRANGEMENTS FOR CONTROLLING NETWORK ELEMENTS

This is a continuation of Application No. PCT/FI98/00678, filed Aug. 31, 1998.

FIELD OF THE INVENTION

This invention concerns transmission of messages for network management in a telecommunication system.

BACKGROUND OF THE INVENTION

In some network management systems, the network elements such as radio repeaters are connected to the network management system using a modem connection. In the context of this application, modem means an adapter used to connect a device to a transmission network. Such a system is shown in FIG. 1. The figure depicts the network management system NMS together with three radio repeaters: Repeater 1, Repeater 2, and Repeater 3. The NMS and the repeaters are connected via modems to a transmission network such as a telephone network. Through the modem connection, the network management system sends to radio repeaters configuration parameters such as the radio channels to be used, the transmission power, the phone number of the modem of the management system, etc. Correspondingly, the radio repeaters send the management system alarms indicating error situations and faults and acknowledgments of the configuration messages received from the NMS.

The establishment of a connection between the NMS and a repeater can be initiated by either the management system NMS or the repeater. The NMS initiates a connection with a repeater when it wants to change or check a configuration parameter of a repeater. In order to contact the repeater, the modem at the network management system NMS establishes a connection with the modem of the repeater via the transmission network. This connection is established when the transmission modem identifies a free modem line in the transmission network. The identifier of the modem is stored in the network management system. When the transmission network is a normal telephone network, the identification is the telephone number of the modem.

The repeaters contact the NMS to send alarms. This is done by using the identification of the modem of the management system stored by the repeater.

The modem of the network management system NMS may be busy due to an NMS initiated connection for configuring a network element. The configuration tolerates rather long delays. At the same time, another network element may try to initiate a connection with the management system in order to transmit an alarm message of high priority. This situation is shown in FIG. 2. In the figure, the arrows show attempts to establish and terminate a connection between a network management system NMS and two radio repeaters, Repeater 1 and Repeater 2, with time sequence starting from the top of the figure.

The network management system initiates a modem connection with Repeater 1 for configuration purposes (201). While the connection is still active, Repeater 2 tries to initiate a modem connection to the network management system for alarm purposes (202). The modem of the management system NMS is busy, however, and the connection can not be successfully established. Repeater 2 thus has to try to initiate the connection again (not shown in the figure). These retrials, on the other hand, reserve the modem capacity and thus increase the probability of collisions. Having transmitted all the necessary information, Repeater 1 and the network management system NMS terminate the connection, thus releasing their modems. At this stage, the modem of the network management system is no longer busy, and the connection request of Repeater 2 (205) can now be fulfilled. The alarm message and the messages triggered by the alarm message are now transmitted. The connection is terminated when all the necessary information has been transferred (206).

The problem with the prior art is the delay incurred in the transmission of messages for the management of network elements. The objective of this invention is to minimize or eliminate these problems. This objective is achieved by using the arrangement and apparatus defined in the independent claims.

SUMMARY OF THE INVENTION

The idea of this invention is to use at least two modems on the network management system side. At least one of these modems is used only for connections initialized by the network management system. At least one other modem is used only for connections initialized by any or a group of network elements controlled by the network management system.

The number of modems used for connections initiated by the management system may be more than one, thus enabling the network management system to initiate simultaneous connections to more than one network element. Likewise, more than one modem can be dedicated for connections initiated by the network elements. In such an arrangement, it is advantageous to divide the network elements into groups. The connection establishments initiated by network elements of a group are then directed to a pre-specified modem at the network management system. This can be achieved by assigning different groups of network elements identifications of different modems at the network management system.

According to another embodiment, a plurality of reception modems are used and the network elements controlled by the network management system are given sets of at least two modem identifications for the network management system. If the first dialed modem is busy when trying to establish a connection to the network management system for alarm purposes, the network element tries to establish the connection via another reception modem of the set. This embodiment may, however require some changes in the controlled network elements.

According to one preferred embodiment, at least one of the controlled network elements is a radio repeater.

BRIEF DESCRIPTION OF THE FIGURES

The invention is described more closely with reference to the accompanying schematic drawings, in which.

DETAILED DESCRIPTION OF THE INVENTION

Figure 1:
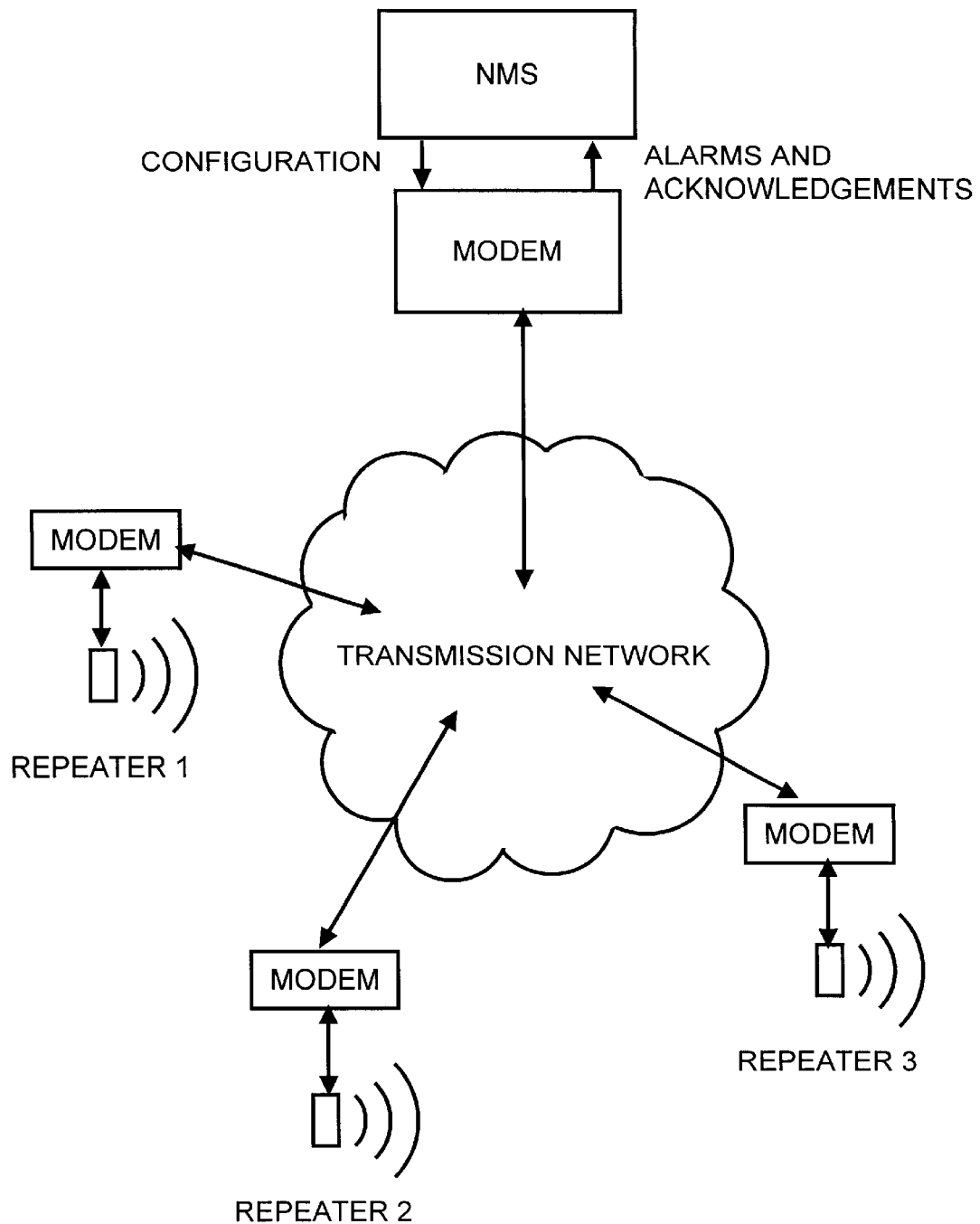
FIG. 1 shows a known arrangement for controlling network elements.
Figure 3:
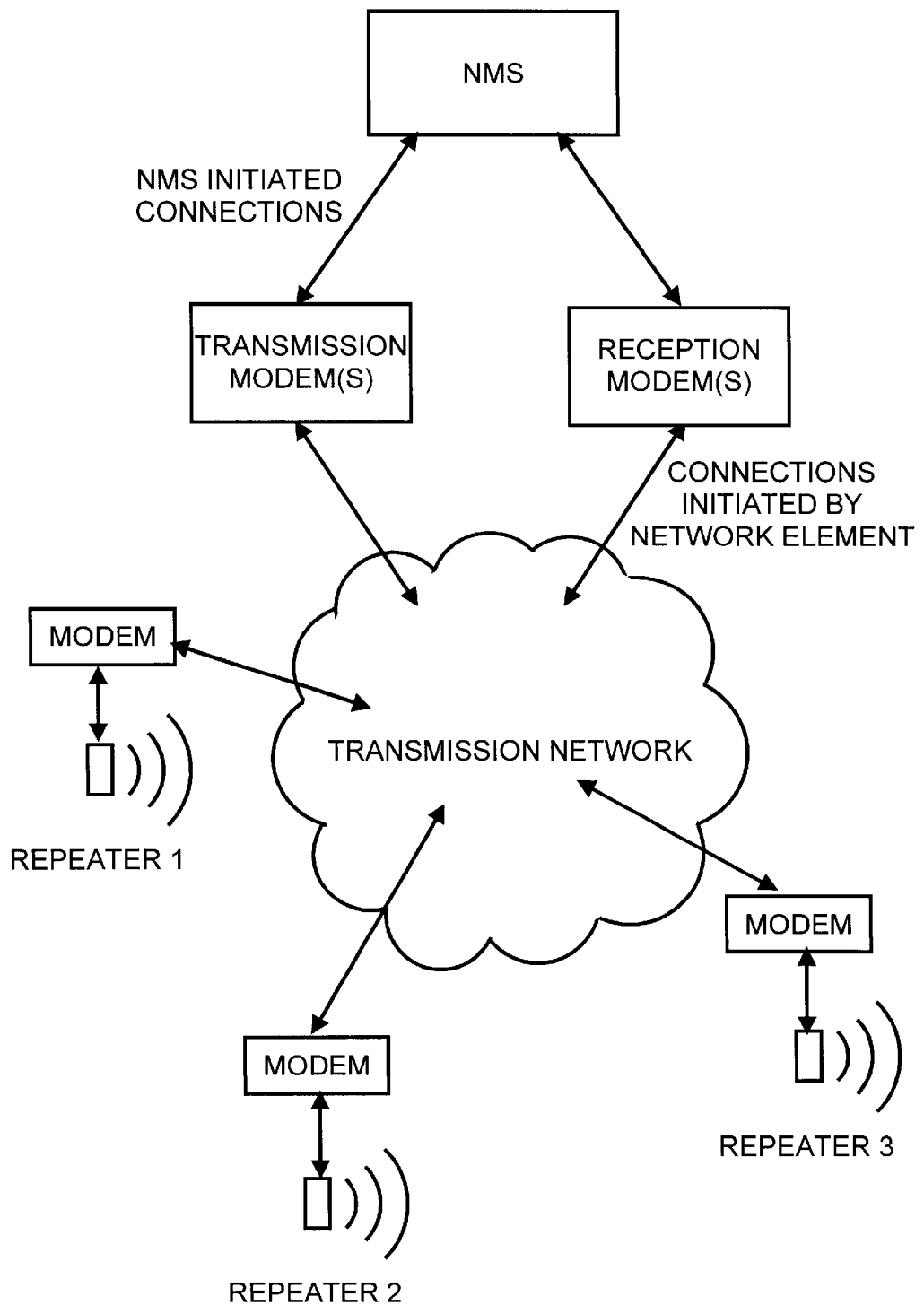
FIG. 3 shows an arrangement according to the present invention.

FIG. 3 shows an arrangement with two sets of modems. The first set, i.e. the set of transmission modems is used for connections initiated by the network management system NMS. The second set, i.e. the set of reception modems is used for connections initiated by the radio repeaters. The connections initiated by the radio repeaters are directed to the reception modems by configuring the repeaters to send their alarms to the phone number of a modem belonging to the set of reception modems. The network management system NMS acquires the capacity to initiate connections to the radio repeaters via the transmission modems and to take part in connections using the reception modems and being initiated by the controlled network elements. No other changes to the prior art arrangement shown in FIG. 1 are necessary.

The set of transmission modems used for connections initiated by the management system may comprise one modem or a plurality of modems. The use of a plurality of modems enables the network management system to initiate simultaneous connections to more than one radio repeater. This improves the delay characteristics of configuration procedures initiated by the management system, but it requires the allocation of an extra telephone line for repeater controlling purposes.

Likewise, the set of reception modems can comprise one modem or a plurality of modems. When using a plurality of reception modems, the radio repeaters are advantageously divided into groups. The connection establishments initiated by network elements of a group are then directed to a specific modem of the network management system. This can be done simply by giving the repeaters of one group the telephone number of the same reception modem of the network management system. Different groups are, in turn, given telephone numbers of different modems on the network management system side.

According to another embodiment utilizing a plurality of reception modems, the controlled network elements such as radio repeaters are given sets of at least two modem numbers for the network management system. The numbers are advantageously ordered in a priority list. When establishing a connection to the network management system for alarm purposes, the repeater first dials the modem number of highest priority. If the first dialed modem is busy, the repeater tries to establish a connection via the reception modem having the next highest priority, etc. This embodiment may, however, require some changes in the repeaters.

Use of a plurality of reception modems decreases the probability of a busy modem line when a repeater tries to establish a connection and thus improves the delay characteristics of the system. This is due to the fact that a smaller number of repeaters directs its connection establishments to a single modem. On the other hand, more modems and telephone lines are needed.

Figure 2:
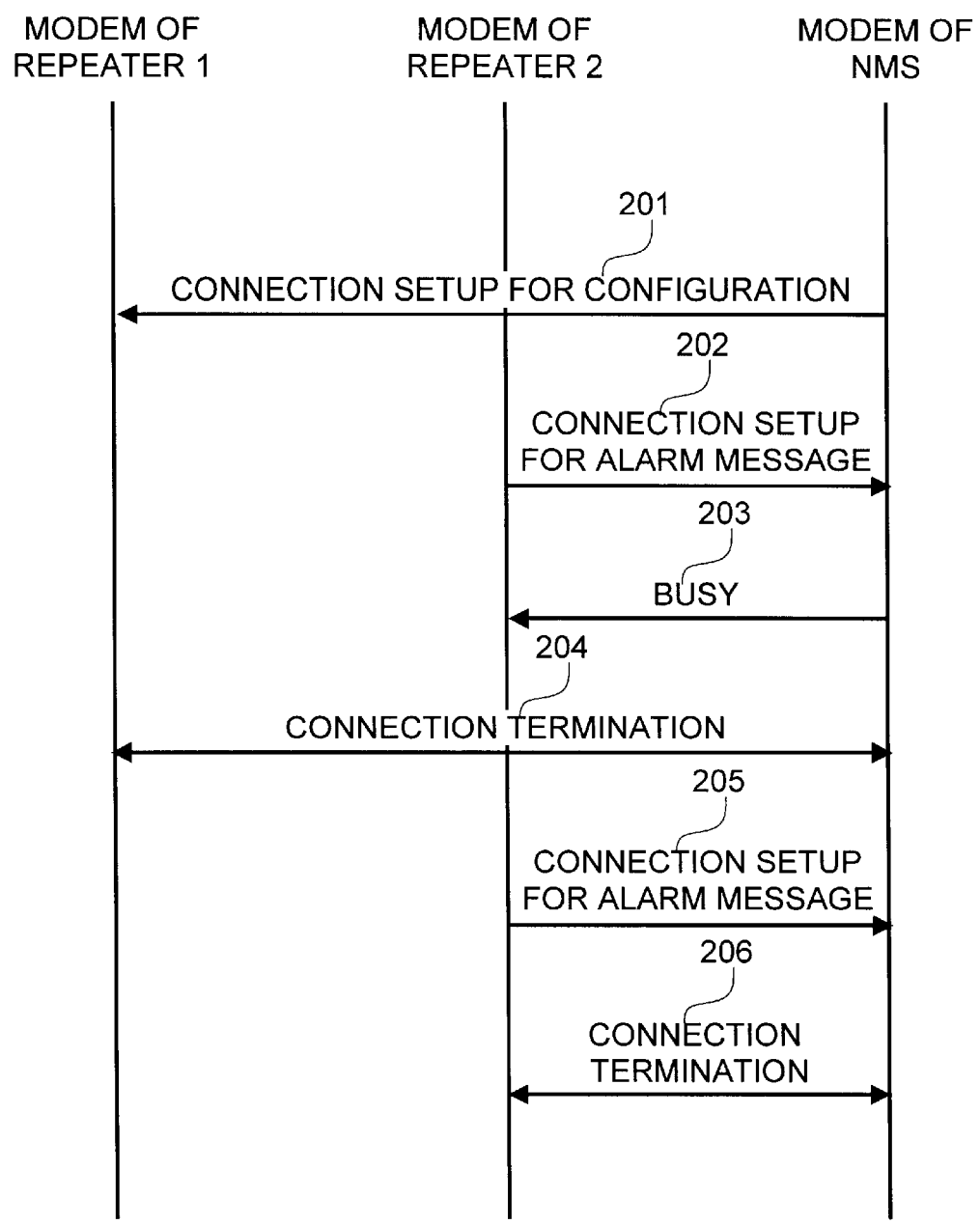
FIG. 2 shows an attempt to initiate a connection in the known arrangement of FIG. 1.
Figure 4:
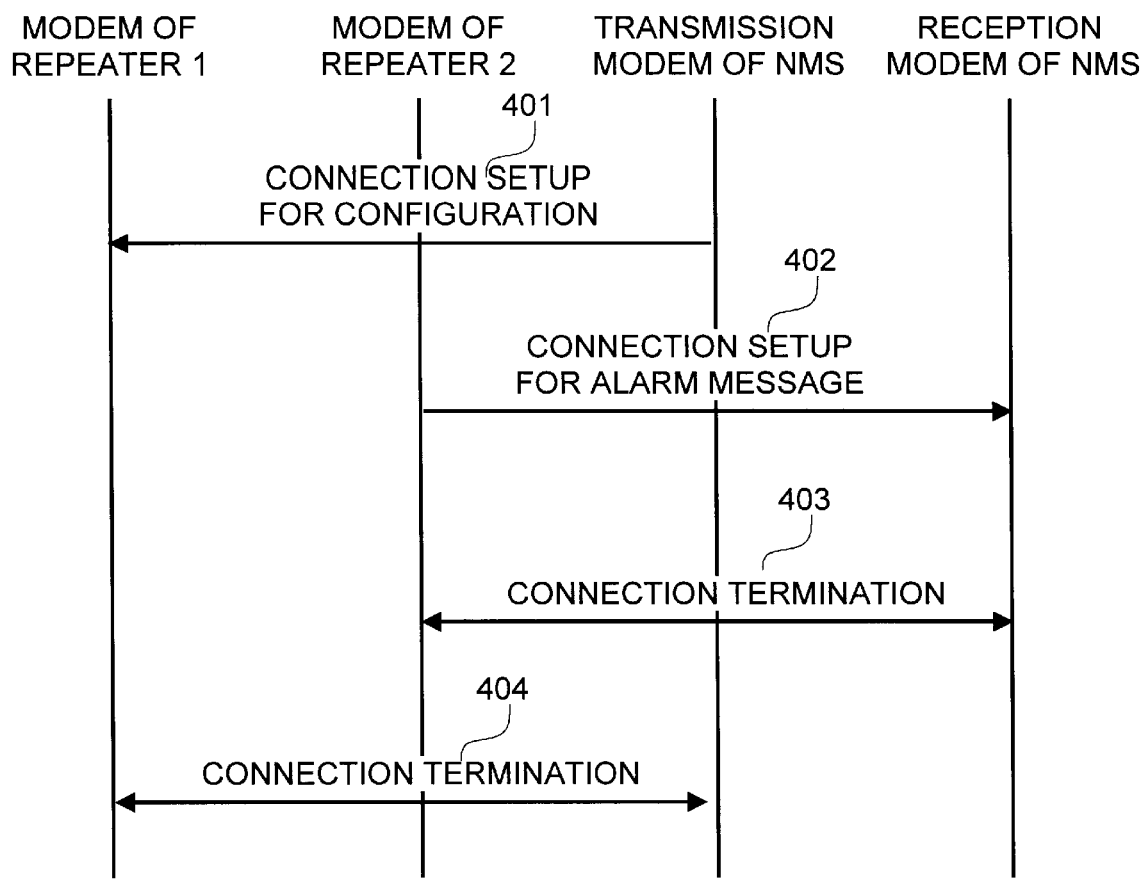
FIG. 4 shows simultaneous connections between a network management system and two radio repeaters.

FIG. 4 shows a sequence of attempts to initiate connections between the network management subsystem and radio repeaters in the arrangement according to the present invention shown in FIG. 3. The same sequence of attempts was shown in FIG. 2 for the arrangement according to the prior art.

When initiating a connection to Repeater 1 (401), the network management system NMS uses its transmission modem. While the NMS initiated connection with Repeater 1 is still active, Repeater 2 observes a need to send an alarm to the management system. To send the alarm, Repeater 2 establishes a connection to the reception modem of the management system (402). When all the necessary information is transferred, the connections are terminated.

It must be noted that the scope of this invention is not limited to arrangements controlling radio repeaters, but can as well be used for controlling other like network elements. This invention is applicable for all network management systems using modems for the establishment of connections between the network management system and the controlled network elements.

What is claimed is:

1. An arrangement for controlling network elements in a telecommunication network comprising:

a plurality of network elements;

a transmission network;

a network management system for controlling the network elements remotely by using modem connections via the transmission network;

wherein the network management system is connected to the transmission network with a first set of modems and a second set of modems;

the first set of modems is used for connections between the network management system and a network element initiated by the network management system; and the second set of modems is used for connections between a network element and the network management system initiated by the network element.

2. An arrangement according to claim 1, wherein the first set of modems comprises only one modem.

3. An arrangement according to claim 1, wherein the second set of modems comprises only one modem.

4. An arrangement according to claim 1, wherein the network elements are divided into groups, a group is allocated a group specific modem from the second set of modems and when establishing a connection to the network management system, a network element belonging to the group directs the connection via the group specific modem.

5. An arrangement according to claim 1, wherein at least one network element is given a subset of at least two modems from the second set of modems and when initiating a connection with the network management system, the network element establishes the connection using a modem belonging to this set.

6. An arrangement according to claim 5, wherein the subset of modems is given a priority order and, when initiating a connection with the network management system, the network element tries to establish a connection using the modems in the priority order until the establishment is successful.

7. An arrangement according to claim 1, wherein at least some of the network elements are radio repeaters.

8. A network management system for a telecommunication network comprising:

a plurality of network elements;

a transmission network;

a network management system for controlling the network elements remotely by using modem connections via the transmission network;

wherein the network management system is arranged to be connected to the transmission network with at least a first set of modems and a second set of modems;

initiate connections towards the network elements using the first set of modems; and take part in connections using the second set of modems and being initiated by the network elements.

9. A network element for a telecommunication network comprising:
- a plurality of network elements;
- a transmission network;
- a network management system for controlling the network elements remotely by using modem connections via the transmission network;
- wherein the network management system is connected to the transmission network with a first set of modems and a second set of modems;
- the first set of modems is used for connections between the network management system and a network element initiated by the network management system; and
- the second set of modems is used for connections between a network element and the network management system initiated by the network element;
- and wherein the network element is arranged to
- receive knowledge of a subset of at least two modems of the second set of modems and a priority order for the subset and
- use the subset in the priority order when initiating a connections with the network management system.

10. A network element according to claim 9, wherein the network element is a radio repeater.

* * * * *